United States Patent
Shigemura et al.

(10) Patent No.: US 12,354,302 B2
(45) Date of Patent: Jul. 8, 2025

(54) OBSTACLE DETECTION APPARATUS, OBSTACLE DETECTION METHOD, AND OBSTACLE DETECTION PROGRAM

(71) Applicants: DENSO CORPORATION, Kariya (JP); TOYOTA JIDOSHA KABUSHIKI KAISHA, Toyota (JP)

(72) Inventors: Shusaku Shigemura, Kariya (JP); Yuta Sakakibara, Kariya (JP); Takuya Nakagawa, Nagoya (JP); Motonari Obayashi, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 356 days.

(21) Appl. No.: 17/930,363

(22) Filed: Sep. 7, 2022

(65) Prior Publication Data

US 2023/0070221 A1    Mar. 9, 2023

(30) Foreign Application Priority Data

Sep. 9, 2021    (JP) .................................. 2021-147059

(51) Int. Cl.
*G06V 20/58*    (2022.01)
*B60W 30/095*    (2012.01)
(Continued)

(52) U.S. Cl.
CPC ........... *G06T 7/73* (2017.01); *B60W 30/0956* (2013.01); *G06T 7/60* (2013.01); *G06V 10/245* (2022.01);
(Continued)

(58) Field of Classification Search
CPC ......... G06T 7/73; G06T 7/60; G06T 2200/04; G06T 2207/10012; G06T 2207/30244;
(Continued)

(56) References Cited

U.S. PATENT DOCUMENTS

| 10,318,826 B2 | 6/2019 | Zhang et al. |
| 11,636,624 B2 * | 4/2023 | Kawabe .............. H04N 17/002 348/148 |

(Continued)

FOREIGN PATENT DOCUMENTS

| CN | 104718750 A * | 6/2015 | ............... B60R 1/00 |
| DE | 102018201305 A1 * | 8/2019 | ............. G01S 13/08 |

(Continued)

OTHER PUBLICATIONS

Hayashi, Takuya et al., Road Condition Recognition Using RGB Camera and Depth Sensor for Environmental Monitoring Robot, IEICE Technical Report, vol. 119 No. 235, Oct. 11, 2019, 25 pages.

*Primary Examiner* — John Villecco
*Assistant Examiner* — Kyla Guan-Ping Tiao Allen
(74) *Attorney, Agent, or Firm* — Maschoff Brennan

(57) ABSTRACT

In an obstacle detection apparatus, the captured image of a vicinity of a vehicle from an imaging apparatus is acquired. A three-dimensional estimation image showing a three-dimensional position of a feature point in the captured image is generated, and a three-dimensional position of an object is estimated. An attribute image in which an object in the captured image is classified into one or more classes that include at least a road-surface class is generated. The three-dimensional estimation image and the attribute image are fused, the feature points and the classes are associated, and road-surface points associated with the road-surface class are extracted. Based on the road-surface points, a road-surface height in the vicinity of the vehicle is estimated. Based on the estimated road-surface height, the three-dimensional position of the object is corrected. Based on the three-dimensional position of the object, an obstacle in the vicinity of the vehicle is detected.

10 Claims, 5 Drawing Sheets

(51) Int. Cl.
*G06T 7/60* (2017.01)
*G06T 7/73* (2017.01)
*G06V 10/24* (2022.01)
*G06V 20/56* (2022.01)
*B60W 10/04* (2006.01)
*B60W 10/18* (2012.01)
*B60W 30/09* (2012.01)

(52) U.S. Cl.
CPC ............ *G06V 20/58* (2022.01); *G06V 20/588* (2022.01); *B60W 10/04* (2013.01); *B60W 10/18* (2013.01); *B60W 30/09* (2013.01); *B60W 2552/00* (2020.02); *G06T 2200/04* (2013.01); *G06T 2207/10012* (2013.01); *G06T 2207/30244* (2013.01); *G06T 2207/30256* (2013.01); *G06T 2207/30261* (2013.01)

(58) Field of Classification Search
CPC ........... G06T 2207/30256; G06T 2207/30261; G06V 10/245; G06V 20/58; G06V 20/588; B60W 2552/00

See application file for complete search history.

(56) References Cited

U.S. PATENT DOCUMENTS

| | | | |
|---|---|---|---|
| 2004/0078726 A1* | 4/2004 | Little | G06N 5/025 |
| | | | 714/48 |
| 2017/0262734 A1* | 9/2017 | Nakata | B60W 30/09 |
| 2019/0235071 A1* | 8/2019 | Reiher | G01S 13/08 |
| 2020/0211224 A1* | 7/2020 | Kawabe | H04N 17/002 |

FOREIGN PATENT DOCUMENTS

| | | | | |
|---|---|---|---|---|
| JP | 2019-028665 A | | 2/2019 | |
| JP | 6711395 B2 | * | 6/2020 | ........... G05D 1/0246 |
| JP | 2021015373 A | * | 2/2021 | |

* cited by examiner

OBSTACLE DETECTION APPARATUS, OBSTACLE DETECTION METHOD, AND OBSTACLE DETECTION PROGRAM

CROSS-REFERENCE TO RELATED APPLICATIONS

This application is based on and claims the benefit of priority from Japanese Patent Application No. 2021-147059, filed on Sep. 9, 2021. The entire disclosure of the above application is incorporated herein by reference.

BACKGROUND

Technical Field

The present disclosure relates to an obstacle detection apparatus that detects an obstacle based on a captured image of a vicinity of a vehicle, an obstacle detection method, and an obstacle detection program.

Related Art

In recent years, market expectations for autonomous driving have been rising. There is also market demand for applications for automatic parking and the like. To enable control of a vehicle for the purpose of automatic parking and the like, a surrounding state of the vehicle is required to be ascertained. Therefore, an imaging apparatus is provided in a periphery of a vehicle body. For appropriate control of a vehicle, an obstacle detection system that detects an obstacle using a captured image that is captured by the imaging apparatus has been developed.

SUMMARY

One aspect of the present disclosure provides an obstacle detection apparatus that detects an obstacle in a vicinity of a vehicle based on a captured image of the vicinity of the vehicle captured by an imaging apparatus. In the obstacle detection apparatus, the captured image of a vicinity of a vehicle from an imaging apparatus is acquired. A three-dimensional estimation image showing a three-dimensional position of a feature point in the captured image is generated, and a three-dimensional position of an object in the vicinity of the vehicle is estimated. An attribute image in which an object in the captured image is classified into one or more classes that include at least a road-surface class is generated. The three-dimensional estimation image and the attribute image are fused, the feature points and the classes are associated, and road-surface points associated with the road-surface class are extracted. Based on the road-surface points, a road-surface height in the vicinity of the vehicle is estimated. Based on the estimated road-surface height, the three-dimensional position of the object in the vicinity of the vehicle is corrected. Based on the three-dimensional position of the object in the vicinity of the vehicle, an obstacle in the vicinity of the vehicle is detected.

DESCRIPTION OF THE EMBODIMENTS

Figure 1:
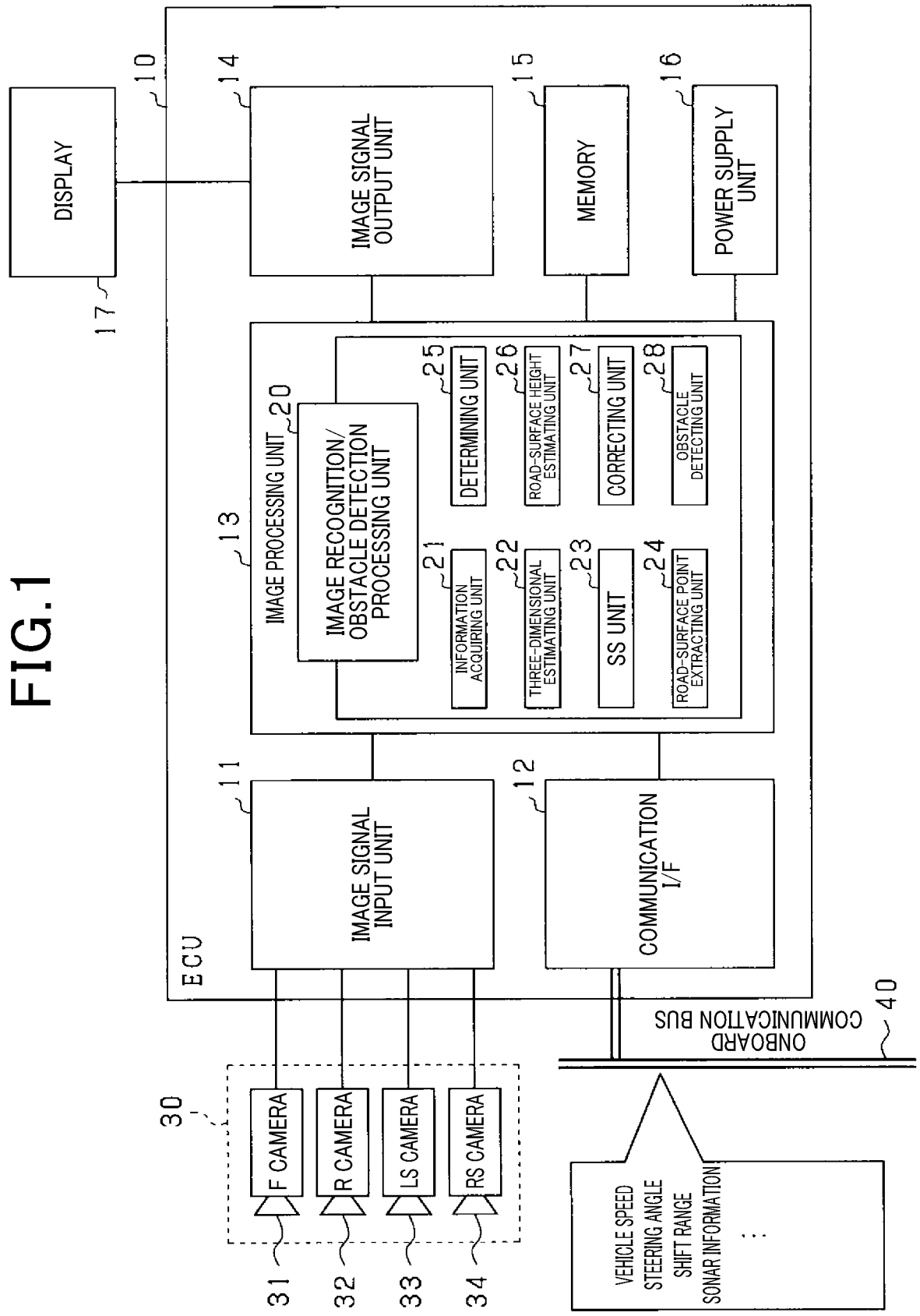
FIG. 1 is a diagram illustrating an obstacle detection system for a vehicle that includes an obstacle detection apparatus according to a first embodiment.

For example, in U.S. Ser. No. 10/318,826B2, an object is detected as an obstacle when a height of the object is higher than a predetermined height, based on a three-dimensional position of the object that is estimated by Structure from Motion (SfM).

When obstacle recognition of a stationary solid object is performed using a captured image, image transformation and geometric calculations are performed using a calibration value that is mounting information of the imaging apparatus. Therefore, ensuring accuracy of the calibration value is important for estimation of the height of the obstacle. Moreover, accuracy of a mounting height of the imaging apparatus is particularly important. If an offset occurs in the mounting height of the imaging apparatus, an offset occurs in a road-surface height. The estimation result for the three-dimensional position of the object in the vicinity of the vehicle is affected. The mounting height of the imaging apparatus may temporarily vary due to effects of air suspension and a load amount of the vehicle. In this case, the height of the obstacle may not be appropriately detected.

It is thus desired to provide an obstacle detection technology that enables a road-surface height to be accurately estimated, a position of an object to be accurately corrected, and an obstacle to be accurately detected.

A first exemplary embodiment of the present disclosure provides an obstacle detection apparatus that detects an obstacle in a vicinity of a vehicle based on a captured image of the vicinity of the vehicle captured by an imaging apparatus. The obstacle detection apparatus includes: an information acquiring unit that acquires the captured image of the vicinity of the vehicle; a three-dimensional estimating unit that generates a three-dimensional estimation image that shows a three-dimensional position of a feature point in the captured image and estimates a three-dimensional position of an object in the vicinity of the vehicle based on the three-dimensional estimation image; an image classifying unit that generates an attribute image in which an object in the captured image is classified into one or more classes that include at least a road-surface class; a road-surface point extracting unit that fuses the three-dimensional estimation image and the attribute image, associates the feature points and the classes, and extracts road-surface points that are the feature points associated with the road-surface class; a road-surface height estimating unit that estimates a road-surface height in the vicinity of the vehicle based on the road-surface points; a correcting unit that corrects the three-dimensional position of the object in the vicinity of the vehicle based on the estimated road-surface height; and an obstacle detecting unit that detects an obstacle in the vicinity of the vehicle based on the three-dimensional position of the object in the vicinity of the vehicle.

According to the obstacle detection apparatus of the present disclosure, the road-surface point extracting unit associates the feature points in the three-dimensional estimation image that is generated by the three-dimensional estimating unit and the classes in the attribute image that is generated by the image classifying unit by fusing the three-dimensional estimation image and the attribute image. Because the road-surface point extracting unit further extracts the feature points that are associated with the road-surface class as the road surface points, the road-surface points can be accurately extracted. Because the road-surface height extracting unit estimates the road-surface height based on the road-surface points that are accurately extracted as described above, the road-surface height can be accurately estimated. Because the correcting unit corrects the three-dimensional position of the object in the vicinity of the vehicle based on the road-surface height that is accurately estimated, accuracy of the three-dimensional position of the object can be ensured. The obstacle detection apparatus can detect an obstacle with high accuracy based on the highly accurate three-dimensional position of the object that is corrected as appropriate. According to the obstacle detection apparatus, even in cases in which a mounting height of the imaging apparatus temporarily changes due to effects of air suspension and a load amount of the vehicle, the road-surface height can be accurately estimated, the position of the object can be accurately corrected, and the obstacle can be accurately detected.

A second exemplary embodiment of the present disclosure may provide an obstacle detection method that is applicable to an obstacle detection apparatus that detects an obstacle in a vicinity of a vehicle based on a captured image of the vicinity of the vehicle captured by an imaging apparatus. The obstacle detection method includes: an information acquiring step of acquiring a captured image of the vicinity of the vehicle; a three-dimensional estimating step of generating a three-dimensional estimation image that shows a three-dimensional position of a feature point in the captured image and estimating a three-dimensional position of an object in the vicinity of the vehicle based on the three-dimensional estimation image; an image classifying step of generating an attribute image in which an object in the captured image is classified into one or more classes that include at least a road-surface class; a road-surface point extracting step of fusing the three-dimensional estimation image and the attribute image, associating the feature points and the classes, and extracting road-surface points that are the feature points associated with the road-surface class; a road-surface height estimating step of estimating a road-surface height in the vicinity of the vehicle based on the road-surface points; a correcting step of correcting the three-dimensional position of the object in the vicinity of the vehicle based on the estimated road-surface height; and an obstacle detecting step of detecting an obstacle in the vicinity of the vehicle based on the three-dimensional position of the object in the vicinity of the vehicle.

A third exemplary embodiment of the present disclosure may provide a non-transitory computer-readable storage medium storing therein an object detection program that includes processes that are performed by a processor to detect an obstacle in a vicinity of a vehicle based on a captured image of the vicinity of the vehicle captured by an imaging apparatus. The processes related to the obstacle detection program include: an information acquiring step of acquiring a captured image of the vicinity of the vehicle; a three-dimensional estimating step of generating a three-dimensional estimation image that shows a three-dimensional position of a feature point in the captured image and estimating a three-dimensional position of an object in the vicinity of the vehicle based on the three-dimensional estimation image; an image classifying step of generating an attribute image in which an object in the captured image is classified into one or more classes that include at least a road-surface class; a road-surface point extracting step of fusing the three-dimensional estimation image and the attribute image, associating the feature points and the classes, and extracting road-surface points that are the feature points associated with the road-surface class; a road-surface height estimating step of estimating a road-surface height in the vicinity of the vehicle based on the road-surface points; a correcting step of correcting the three-dimensional position of the object in the vicinity of the vehicle based on the estimated road-surface height; and an obstacle detecting step of detecting an obstacle in the vicinity of the vehicle based on the three-dimensional position of the object in the vicinity of the vehicle.

According to the obstacle detection method and the obstacle detection program described above, in a manner similar to the obstacle detection apparatus, even in cases in which a mounting height of the imaging apparatus temporarily changes due to effects of air suspension and a load amount of the vehicle, the road-surface height can be accurately estimated, the position of the object can be accurately corrected, and the obstacle can be accurately detected.

First Embodiment

FIG. 1 shows an obstacle detection system that is mounted in a vehicle and detects an obstacle in a vicinity of the vehicle. The obstacle detection system includes an imaging apparatus 30, an obstacle detection apparatus 10, and a display 17 that serves as a display apparatus.

The imaging apparatus 30 includes a front camera 31, a rear camera 32, a left-side camera 33, and a right-side camera 34. The front camera 31, the rear camera 32, the left-side camera 33, and the right-side camera 34 are each a single-lens digital camera. Here, the front camera 31, the rear camera 32, the left-side camera 33, and the right-side camera 34 may hereafter be simply referred to as cameras 31, 32, 33, and 34. In each of the cameras 31, 32, 33, and 34, a wide-angle lens (specifically, a fish-eye lens) of which a viewing angle is set to 180 degrees is used.

For example, the front camera 31 may be attached to a front end (such as a radiator grille) in an advancing direction of the vehicle and capture an image of an area ahead of the vehicle in the advancing direction. The rear camera 32 may be attached to a rear end in the advancing direction of the vehicle and capture an area to the rear of the vehicle. For example, the left-side camera 33 may be attached to a left side-view mirror of the vehicle and capture an image of a left side of the vehicle in a vehicle width direction. For example, the right-side camera 34 may be attached to a right side-view mirror of the vehicle and captures an image of a right side of the vehicle in the vehicle width direction.

The cameras 31, 32, 33, and 34 each capture an image of the vicinity of the vehicle and outputs image data of the captured image to an image signal input unit 11 of the obstacle detection apparatus 10. The image signal input unit 11 acquires image information that is outputted from each of the cameras 31, 32, 33, and 34, and outputs the acquired image information to an image processing unit 13.

The obstacle detection apparatus 10 is mainly configured by a microcomputer or the like, and includes a central processing unit (CPU), a read-only memory (ROM), a random access memory (RAM), an input/output (I/O), an onboard communication bus 40 that connects these configurations, and the like. Specifically, the obstacle detection apparatus 10 includes the image signal input unit 11, a communication interface (communication I/F) 12, the image processing unit 13, an image signal output unit 14, a memory 15, and a power supply unit 16.

The communication I/F 12 is connected to a vehicle speed sensor, a steering angle sensor, a sonar, a shift range sensor (that detects a shift range of automatic transmission), and the like by the onboard communication bus 40, and acquires vehicle information, such as a vehicle speed, a steering angle, a shift range, and sonar information of the vehicle. More specifically, for example, the communication I/F 12 may receive, from the vehicle speed sensor, a signal that is based on an own vehicle speed Vc that is a speed of the vehicle. The communication I/F 12 may receive, from the steering sensor, a signal that is based on a steering angle θs of the vehicle that is based on a steering operation by a driver of the vehicle. The communication I/F 12 may receive, from the sonar, a signal that indicates a search result of a search for an obstacle in the vicinity of the vehicle using sonar waves as probe waves. The communication I/F 12 may receive, from the shift range sensor, shift range information of automatic transmission. Thus, the communication I/F 12 may receive the own vehicle speed Vc, the steering angle θs, the search result for the vehicle vicinity by the probe waves, and the shift range information.

The memory 15 corresponds to a storage unit and includes the RAM, the ROM, a writable non-volatile storage medium, and the like. The memory 15 stores therein a computer program that is implemented by the image processing unit 13.

The power supply unit 16 supplies the image processing unit 13 with electric power to enable the image processing unit 13 to implement a program when a power supply switch of the vehicle is turned on. The image signal output unit 14 outputs image information that is processed by the image processing unit 13 to the display 17.

The image processing unit 13 includes an image recognition/obstacle detection processing unit 20. The image recognition/obstacle detection processing unit 20 includes an information acquiring unit 21, a three-dimensional estimating unit 22, a semantic segmentation (SS) unit 23, a road-surface point extracting unit 24, a determining unit 25, a road-surface height estimating unit 26, a correcting unit 27, and an obstacle detecting unit 28. The image processing unit 13 performs an image recognition/obstacle detection process by implementing a computer program that is stored in the memory 15 in advance.

Figure 2:
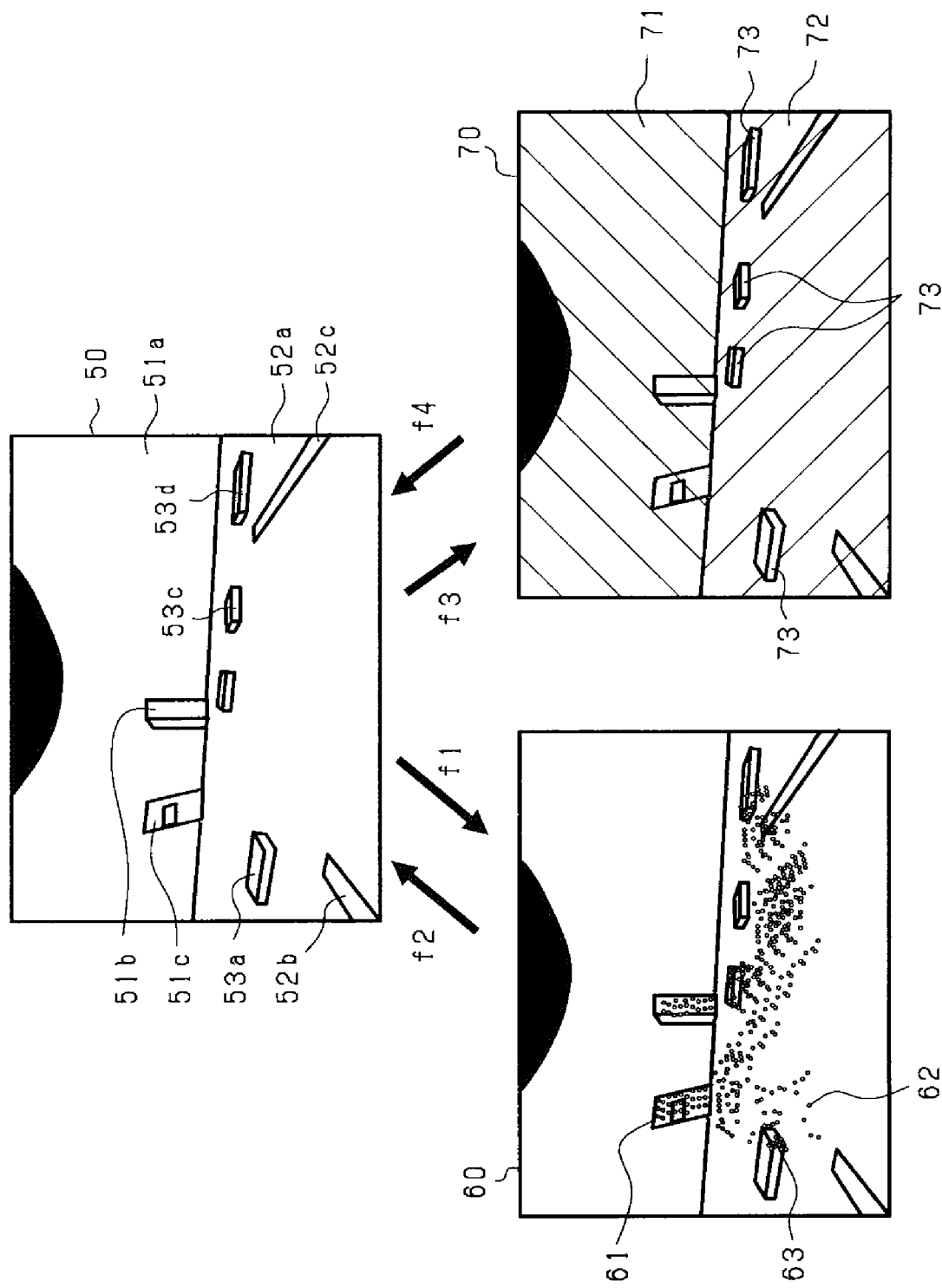
FIG. 2 is a diagram for explaining image processing performed between a captured image, a three-dimensional estimation image, and an SS image.

The information acquiring unit 21 acquires the captured image of the vicinity of the vehicle that is inputted from the image signal input unit 11. For example, as shown in FIG. 2, the information acquiring unit 21 may acquire a captured image 50 that is captured by the imaging apparatus 30 using a fish-eye lens. In the captured image 50, a sky 51*a*, solid stationary objects 51*b* and 51*c*, a road 52*a*, and white lines 52*b* and 52*c* on the road 52*a*, and wheel stops 53*a* to 53*d* are captured. In addition, the information acquiring unit 21 acquires the vehicle information received from the communication I/F 12.

The three-dimensional estimating unit 22 generates a three-dimensional estimation image that shows three-dimensional positions of feature points in the captured image. The three-dimensional estimating unit 22 then estimates a three-dimensional position of an object in the vicinity of the vehicle based on the three-dimensional estimation image. As shown in FIG. 2, the three-dimensional estimating unit 22 performs image transformation of the captured image 50 by SfM and generates an SfM image 60 that serves as the three-dimensional estimation image. Transformation f1 that indicates image transformation from the captured image 50 to the SfM image 60 can be performed by coordinate transformation using an SfM forward transformation lookup table (LUT). Transformation f2 that indicates image transformation from the SfM image 60 to the captured image 50 can be performed by coordinate transformation using an SfM reverse transformation LUT that is an inverse matrix of the SfM forward transformation LUT.

In the SfM image 60, feature points 61 to 63 are displayed. When the captured image 50 and the SfM image 60 are compared, the feature points 61 are feature points that are displayed on the solid stationary objects 51*b* and 51*c*. The feature points 62 are feature points that are displayed on the road 52*a*, and the white lines 52*b* and 52*c*. The feature points 63 are feature points that are displayed on the wheel stops 53*a* to 53*d*.

The SS unit 23 is an example of an image classifying unit that generates an attribute image that classifies objects in the captured image into one or more classes that include at least a road-surface class. As shown in FIG. 2, the captured image 50 is image-transformed by SS and an SS image 70 that serves as the attribute image is generated. Transformation f3 that indicates image transformation from the captured image 50 to the SS image 70 can be performed by coordinate transformation using an SS forward transformation LUT. Transformation f4 that indicates image transformation from the SS image 70 to the captured image 50 can be performed by coordinate transformation using an SS reverse transformation LUT that is an inverse matrix of the SS forward transformation LUT.

In the SS image 70, as class classification, a background class 71, a road-surface class 72, and a wheel stop/curb class 73 are color-coded and segmented. The sky 51*a* and the solid stationary objects 51*b* and 51*c* are classified into the background class 71. The road 52*a* and the white lines 52*b* and 52*c* are classified into the road-surface class 72. The wheel stops 53*a* to 53*d* are classified into the wheel stop/curb class 73.

The road-surface point extracting unit 24 fuses the three-dimensional estimation image and the attribute image. The road-surface point extracting unit 24 then associates the feature points and the classes, and extracts road-surface points that are the feature points that are associated with the road-surface class. For example, transformation f2 may be performed on the SfM image 60 and then transformation f3 may be further performed. Thus, fusion of the SfM image 60 and the SS image 70 can be implemented.

Through fusion of the SfM image 60 and the SS image 70, the feature points 61 to 63 in the SfM image 60 are each associated with the background class 71, the road-surface class 72, or the wheel stop/curb class 73 in the SS image. The feature points 62 that are associated with the road-surface class 72 a extracted as the road-surface points.

The determining unit 25 performs various types of determinations regarding the road-surface points. For example, the determining unit 25 may be configured to determine whether the number of road-surface points is equal to or greater than a predetermined first threshold X1. Alternatively, the determining unit 25 may be configured to determine that estimation reliability is low when the number of road-surface points that are used to estimate a road-surface height is less than a predetermined second threshold, and determine that the estimation reliability is high when the number of road-surface points is equal to or greater than the predetermined second threshold. The second threshold may be a value that is same as the first threshold or a differing value.

The road-surface height estimating unit 26 estimates a height of the road surface in the vicinity of the vehicle based on the road-surface points. For example, as shown in FIG. 3, the road-surface height estimating unit 26 may be configured to generate a frequency distribution of road-surface-point height based on the plurality of extracted road-surface points, and estimate a road-surface height h1 that is a peak in the frequency distribution as the road-surface height.

Figure 3:
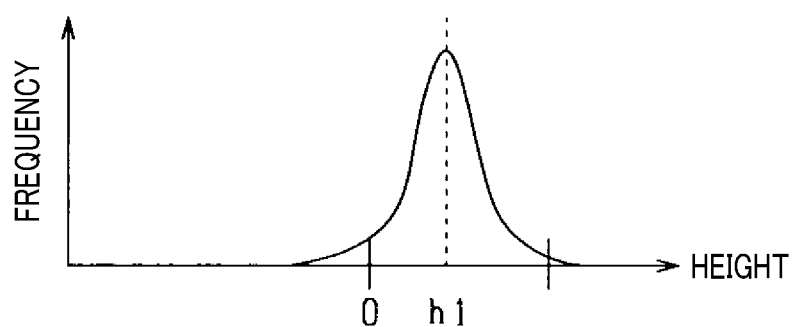
FIG. 3 is a diagram for explaining estimation of a road-surface height based on a frequency distribution of road-surface points.

The road-surface height estimating unit 26 may be configured to determine reliability of the frequency distribution of the road-surface-point height such as that shown in FIG. 3. When determined that the frequency distribution is reliable, the road-surface height estimating unit 26 may estimate the height of the road surface based on the frequency distribution of the road-surface-point height. For example, when the frequency distribution can be considered to be a normal distribution, the road-surface height estimating unit 26 may determine that the frequency distribution is reliable and estimate the road-surface height. Estimation accuracy regarding the road-surface height can be further improved.

The road-surface height estimating unit 26 may be configured to estimate the road-surface height when the determining unit 25 determines that the number of extracted road-surface points is equal to or greater than the predetermined first threshold X1. The estimation accuracy regarding the road-surface height can be further improved.

The road-surface height estimating unit 26 may be configured to estimate the road-surface height based on the road-surface points that are continuously associated with the road-surface class for a predetermined period. The estimation accuracy regarding the road-surface height can be further improved. In this case, for example, the determining unit 25 may be configured to be capable of determining that the road-surface point is continuously associated with the road-surface class over the predetermined period. Furthermore, the road-surface point extracting unit 24 may be configured to extract only the road-surface points that are continuously associated with the road-surface class over the predetermined period.

The road-surface height estimating unit 26 may be configured to provide the estimation result of the road-surface height together with information that the estimation reliability is low, when the determining unit 25 determines that the number of road-surface points that are used for estimation of the road-surface height is less than the predetermined second threshold. In addition, the road-surface height estimating unit 26 may be configured to provide the estimation result of the road-surface height together with information that the estimation reliability is high, when the determining unit 25 determines that the number of road-surface points that are used for estimation of the road-surface height is equal to or greater than the predetermined second threshold. While circumstances under which an estimation value of the road-surface height is able to be provided are broadened, the information that is the estimation reliability is provided. As a result, obstacle detection and vehicle control can be appropriately performed under various circumstances.

The correcting unit 27 corrects the three-dimensional position of the object in the vicinity of the vehicle based on the estimated road-surface height. When the three-dimensional estimating unit 22 estimates that a height of the object is z and the road-surface height estimating unit 26 estimates that the road-surface height is h, the correcting unit 27 corrects the height of the object to z-h.

The correcting unit 27 may be configured to correct the mounting information of the imaging apparatus 30 based on changes over time in the road-surface height that is estimated by the road-surface height estimating unit 26. For example, when an offset in the road-surface height continues over a fixed period, an offset in mounting of the imaging apparatus 30 can be considered to have occurred. The mounting information of the imaging apparatus 30 is corrected. As a result, the three-dimensional position of the object can be prevented from being corrected in each image recognition/obstacle detection process. Thus, processing load can be reduced.

The obstacle detecting unit 28 detects an obstacle in the vicinity of the vehicle based on the three-dimensional position of the object in the vicinity of the vehicle. When the correcting unit 27 corrects the three-dimensional position of the object, the obstacle detecting unit 28 detects the obstacle based on the three-dimensional position after correction. When the obstacle is detected, the obstacle detecting unit 28 also performs a process to control a driving source and a brake apparatus of the vehicle to prevent the vehicle from coming into contact with the obstacle.

The display 17 is arranged inside a vehicle cabin and displays an image to an occupant based on the image information that is received from the image processing unit 13 through the image signal output unit 14. As a result, in the obstacle detection system, an image that is processed by the image processing unit 13 can be viewed.

Figure 4:
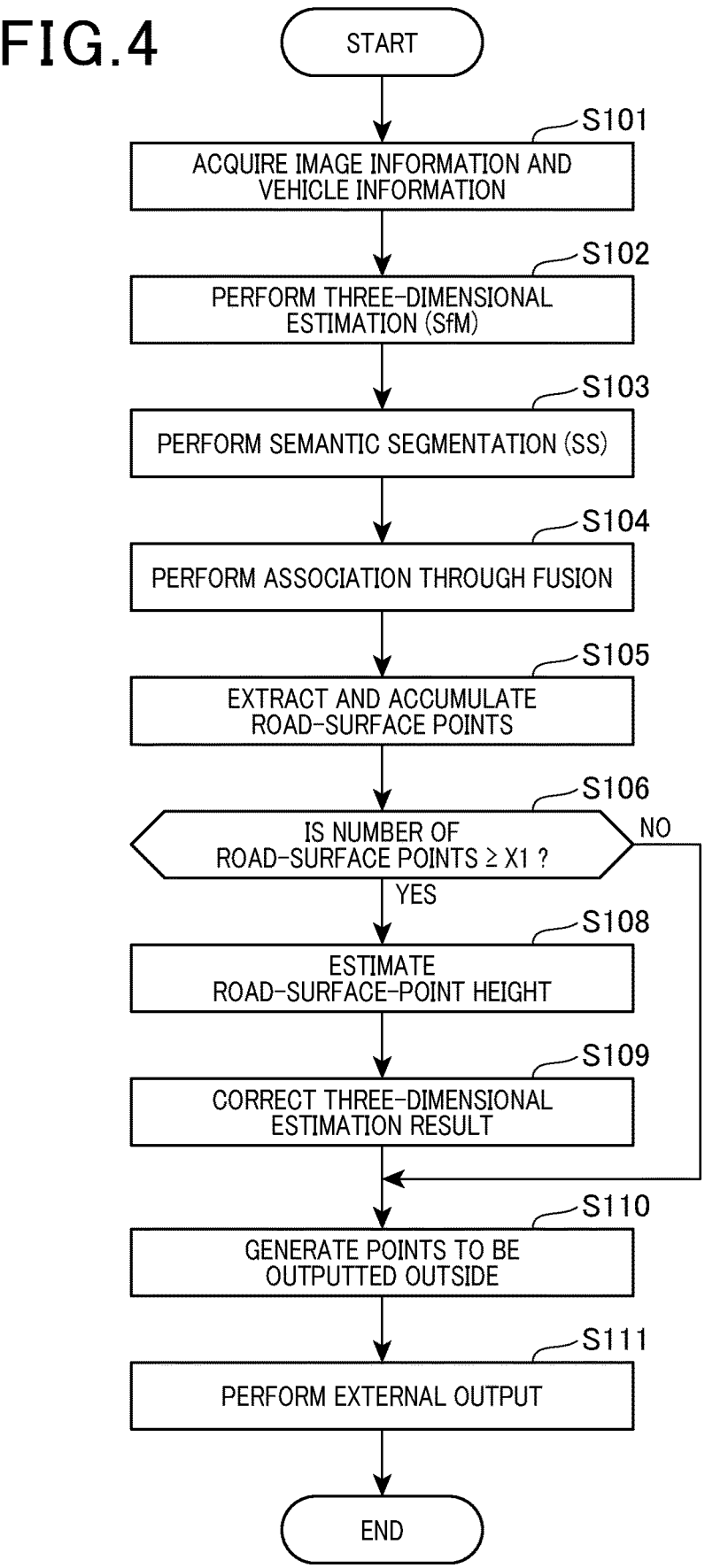
FIG. 4 is a flowchart illustrating an image recognition/obstacle detection process according to the first embodiment.

In the obstacle detection system shown in FIG. 1, an obstacle in the vicinity of the vehicle is detected and the vehicle is controlled by the image processing unit 13 of the obstacle detection apparatus 10 implementing an obstacle detection program that is a computer program that is stored in the memory 15. FIG. 4 shows a flowchart of the image recognition/obstacle detection process that is performed by the image processing unit 13. The process shown in the flowchart is continuously performed at a predetermined interval.

At step S101, the image processing unit 13 acquires the image information and the vehicle information. As the image information, the image processing unit 13 acquires the captured image of the vicinity of the vehicle from the imaging apparatus 30, through the image signal input unit 11. As the vehicle information, the image processing unit 13 acquires various types of vehicle information such as the own vehicle speed Vc that can be acquired through the communication I/F. Then, the image processing unit 13 proceeds to step S102.

At step S102, the image processing unit 13 performs the three-dimensional estimation through SfM based on the information acquired at step S101. Specifically, the image processing unit 13 generates the three-dimensional estimation image that shows the three-dimensional positions of the feature points in the captured image and estimates the three-dimensional position of the object in the vicinity of the vehicle based on the three-dimensional estimation image. As shown in FIG. 2, when the captured image 50 is acquired as the image information, the image processing unit 13 performs coordinate transformation (transformation f1) using the SfM forward transformation LUT, and generates the SfM image 60. The image processing unit 13 estimates the three-dimensional position of the object in the vicinity of the vehicle based on the generated SfM image 60. Then, the image processing unit 13 proceeds to step S103.

At step S103, the image processing unit 13 performs image classification through SS based on the information acquired at step S101. Specifically, the image processing unit 13 generates the attribute image in which the objects in the captured image are classified into one or more classes that include at least the road-surface class. As shown in FIG. 2, when the captured image 50 is acquired as the image information, the image processing unit 13 performs coordinate transformation (transformation f3) using the SS forward transformation LUT and generates the SS image 70. Then, the image processing unit 13 proceeds to step S104.

At step S104, the image processing unit 13 fuses the SfM image 60 generated at step S102 and the SS image 70 generated at step S103. As a result, the feature points in the SfM image 60 and the classes in the SS image 70 are associated. As shown in FIG. 2, when the SfM image 60 and the SS image 70 are fused, for example, first, the image processing unit 13 may perform coordinate transformation (transformation f2) using the SfM reverse transformation LUT and further perform coordinate transformation (transformation f3) using the SS forward transformation LUT. As a result, the feature points in the SfM image 60 and the classes in the SS image 70 can be associated. Then, the image processing unit 13 proceeds to step S105.

At step S105, the image processing unit 13 extracts the road-surface points that are the feature points associated with the road-surface class at step S104. As shown in FIG. 2, the feature points 62 that are associated with the road-surface class are extracted as the road-surface points and accumulated. Then, the image processing unit 13 proceeds to step S106.

At step S106, the image processing unit 13 determines whether the number of road-surface points that are extracted and accumulated at step S105 is equal to or greater than the predetermined first threshold X1. For example, the first threshold X1 may be a value that is obtained by the number of road-surface points at which the frequency distribution becomes a normal distribution such as that shown in FIG. 3 being experimentally or empirically determined. When determined that the number of road-surface points is ≥X1, the image processing unit 13 proceeds to step S108. When determined that the number of road-surface points is <X1, the image processing unit 13 proceeds to step S110.

At step S108, the image processing unit 13 estimates the road-surface height in the vicinity of the vehicle based on the road-surface points that are extracted and accumulated at step S105. Specifically, for example, as shown in FIG. 3, the image processing unit 13 may generate the frequency distribution of the road-surface-point height based on the plurality of extracted road-surface points, and estimate the road-surface height h1 that is the peak in the frequency distribution as the road-surface height. Then, the image processing unit 13 proceeds to step S109.

At step S109, the image processing unit 13 corrects the three-dimensional estimation result estimated at step S102 based on the road-surface height estimated at step S108, and corrects the three-dimensional position of the object in the vicinity of the vehicle. For example, when the height of the object is estimated to be z1 at step S102 and the road-surface height is estimated to be h1 at step S108, the image processing unit 13 corrects the height of the object to be z1-h1. Then, the image processing unit 13 proceeds to step S110.

At step S110, the image processing unit 13 generates points that are outputted outside. Specifically, the image processing unit 13 generates points that indicate the three-dimensional position of the object in the vicinity of the vehicle, and points that indicate the obstacle that is detected based on the three-dimensional position of the object in the vicinity of the vehicle. When the correction at step S109 is performed based on the three-dimensional position of the object estimated at step S102, the image processing unit 13 performs obstacle detection and generation of the points to be outputted outside based on the corrected three-dimensional position. When the correction at step S109 is not performed, the image processing unit 13 performs obstacle detection and generation of the points to be outputted outside based on the three-dimensional position of the object estimated at step S102 (uncorrected three-dimensional position). Then, the image processing unit 13 proceeds to step S111 and ends the process after performing external output to the display 17 and the like.

As described above, the processes related to the obstacle detection program include: an information acquiring step (corresponding to step S101) of acquiring a captured image of the vicinity of the vehicle; a three-dimensional estimating step (corresponding to step S102) of generating a three-dimensional estimation image that shows a three-dimensional position of a feature point in the captured image and estimating a three-dimensional position of an object in the vicinity of the vehicle based on the three-dimensional estimation image; an image classifying step (corresponding to step S103) of generating an attribute image in which an object in the captured image is classified into one or more classes that include at least a road-surface class; a road-surface point extracting step (corresponding to steps S104 and S105) of fusing the three-dimensional estimation image and the attribute image, associating the feature points and the classes, and extracting road-surface points that are the feature points associated with the road-surface class; a determining step (corresponding to step S106) of performing various types of determinations regarding the road-surface points; a road-surface height estimating step (corresponding to step S108) of estimating a road-surface height in the vicinity of the vehicle based on the road-surface points; a correcting step (corresponding to step S109) of correcting the three-dimensional position of the object in the vicinity of the vehicle based on the estimated road-surface height; and an obstacle detecting step (corresponding to step S110) of detecting an obstacle in the vicinity of the vehicle based on the three-dimensional position of the object in the vicinity of the vehicle.

In addition, this obstacle detection program is implemented. As a result, the obstacle detection apparatus 10 can perform an obstacle detection method that includes the above-described steps.

The SfM image 60 that is generated at step S102 and the SS image 70 that is generated at step S103 are fused at step S104. At step S104, association between the feature points in the SfM image 60 and the classes in the SS image 70 is further performed. At stop S105, the feature points that are associated with the road-surface class are further extracted as the road-surface points. Therefore, the road-surface points can be accurately extracted. Furthermore, when the number of road-surface points is determined to be equal to or greater than the predetermined first threshold X1 at step S106, at step S108, the road-surface height h1 is estimated based on the frequency distribution of the road-surface points such as that shown in FIG. 3. At step S108, the road-surface height estimating unit 26 estimates the road-surface height when the road-surface points that are accurately extracted at steps S102 to S105 are accumulated to a quantity that is equal to or greater than the predetermined first threshold X1. Therefore, the road-surface height can be accurately estimated. At step S109, the three-dimensional position of the object in the vicinity of the vehicle estimated at step S102 is corrected based on the road-surface point height that is accurately estimated. is corrected. Therefore, accuracy of the three-dimensional position of the object can be ensured. Consequently, at step S110, the obstacle can be detected with high accuracy based on the highly accurate three-dimensional position of the object that has been corrected as appropriate.

Second Embodiment

Figure 5:
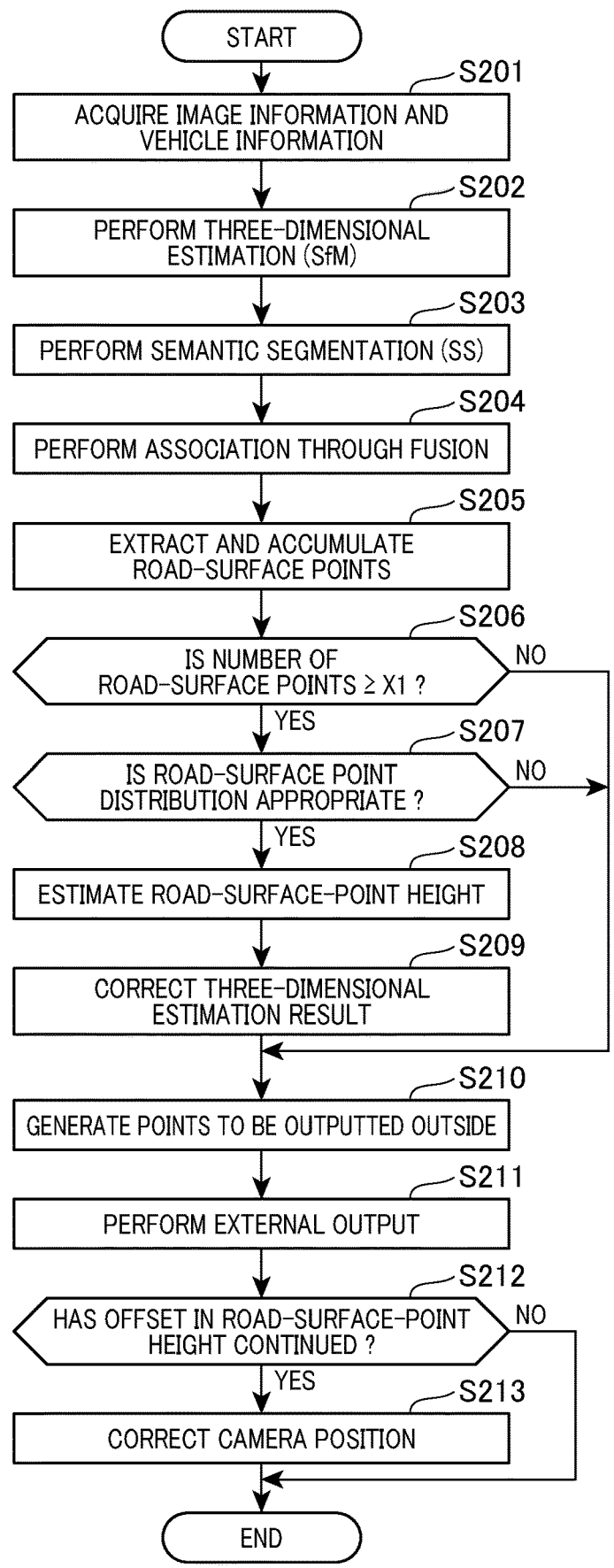
FIG. 5 is a flowchart illustrating an image recognition/obstacle detection process according to a second embodiment.

FIG. 5 shows a flowchart of an image recognition/obstacle detection process that is performed by the image processing unit 13 according to a second embodiment. The process shown in the flowchart is continuously performed at a predetermined interval. The flowchart shown in FIG. 5 differs from the flowchart shown in FIG. 4 in that processes shown at steps S207, S212, and S213 are included. Processes shown at steps S201 to S206 and S208 to S211 in FIG. 5 are similar to the processes shown at steps S101 to S106 and S108 to S111 in FIG. 4. Therefore, descriptions are omitted.

At step S206, when determined that the number of road-surface points is ≥X1, the image processing unit 13 proceeds to step S207. At step S207, the image processing unit 13 generates a road-surface point distribution that is a frequency distribution of the road-surface-point height using the road-surface points that are extracted and accumulated at step S205. Furthermore, the image processing unit 13 determines whether the road-surface point distribution is appropriate. Specifically, when the road-surface point distribution can be considered to be a normal distribution, the image processing unit 13 determines that the road-surface point distribution is appropriate and proceeds to step S208. When the road-surface point distribution cannot be considered to be a normal distribution, the image processing unit 13 determines that the road-surface point distribution is not appropriate and proceeds to step S210.

After performing external output at step S211, the image processing unit 13 proceeds to step S212. At step S212, the image processing unit 13 determines whether an offset in road-surface height has continued for a fixed period. When the offset in road-surface height has continued, the image processing unit 13 proceeds to step S213 and corrects the mounting information of the cameras 31 to 34. When the offset in road-surface height has not continued, the image processing unit 13 immediately ends the process without performing step S213.

According to the image recognition/obstacle detection process shown in FIG. 5, after the number of road-surface points is determined to be equal to or greater than the first threshold X1 at step S206 and, further, when the road-surface point distribution is determined to be appropriate at step S207, the road-surface height estimation step and the correction step shown at steps S208 and S209 are performed. Therefore, the road-surface height can be estimated with more accuracy based on the road-surface points that have higher reliability. Moreover, the three-dimensional position of the object can be more accurately corrected.

In addition, at steps S212 and S213, the mounting information of the imaging apparatus 30 is corrected based on changes over time in the road-surface height that is estimated at step S208. When the offset in road-surface height is determined to have continued over the fixed period at step S212, an offset in the mounting of the imaging apparatus 30 is likely to have occurred. In this case, at step S213, the mounting information of the imaging apparatus 30 is corrected. As a result, the three-dimensional position of the object can be prevented from being corrected in each image recognition/obstacle detection process. Thus, processing load can be reduced. When the offset in road-surface height is determined to not have continued over the fixed period at step S212, the mounting height of the imaging apparatus 30 is likely to have temporarily changed due to the effects of air suspension or the load amount of the vehicle. In this case, step S213 is not performed and the process is immediately ended.

According to the embodiments described above, the following effects can be obtained.

The object detection apparatus 10 detects an obstacle in the vicinity of the vehicle based on a captured image of the vicinity of the vehicle captured by the imaging apparatus 30. The obstacle detection apparatus 10 includes the information acquiring unit 21, the three-dimensional estimating unit 22, an image classifying unit (such as the SS unit 23), the road-surface point extracting unit 24, the road-surface height estimating unit 26, the correcting unit 27, and the obstacle detecting unit 28.

The information acquiring unit 21 acquires a captured image (such as the captured image 50) of the vicinity of the vehicle. The three-dimensional estimating unit 22 generates a three-dimensional estimation image (such as the SfM image 60) that shows a three-dimensional position of a feature point in the captured image and estimates a three-dimensional position of an object in the vicinity of the vehicle based on the three-dimensional estimation image. The image classifying unit generates an attribute image (such as the SS image 70) in which the object in the captured image is classified into one or more classes that include at least the road-surface class. The road-surface point extracting unit 24 fuses the three-dimensional estimation image and the attribute image, associates the feature points and the classes, and extracts road-surface points that are the feature points that are associated with the road-surface class.

Therefore, the road-surface point can be accurately extracted. The road-surface height estimating unit 26 estimates a road-surface height in the vicinity of the vehicle based on the road-surface points. The correcting unit 27 corrects the three-dimensional position of the object in the vicinity of the vehicle based on the estimated road-surface height. The obstacle detecting unit 28 detects an obstacle in the vicinity of the vehicle based on the three-dimensional position of the object in the vicinity of the vehicle. Therefore, estimation of the road-surface height and correction based on the estimation can be accurately performed, and accuracy of the three-dimensional position of the object can be ensured. Consequently, the obstacle can be detected with high accuracy. According to the obstacle detection apparatus 10, even in cases in which the mounting height of the imaging apparatus temporarily changes due to the effects of air suspension or the load amount of the vehicle, the road-surface height can be accurately estimated, the position of the object can be accurately corrected, and the obstacle can be accurately detected.

The road-surface height estimating unit 26 may be configured to determine reliability of the frequency distribution of the road-surface-point height. When determined that the frequency distribution is reliable, the road-surface height estimating unit 26 may estimate the road-surface height based on the frequency distribution of the road-surface-point height. The estimation accuracy regarding the road-surface height can be further improved.

The road-surface height estimating unit 26 may be configured to estimate the road-surface height when the number of extracted road-surface points is equal to or greater than the predetermined first threshold X1. The estimation accuracy regarding the road-surface height can be further improved.

The road-surface height estimating unit 26 may be configured to estimate the road-surface height based on the road-surface points that are continuously associated with the road-surface class for a predetermined period. The estimation accuracy regarding the road-surface height can be further improved.

The road-surface height estimating unit 26 may be configured to provide the estimation result of the road-surface height together with information that the estimation reliability is low when the number of road-surface points that are used to estimate the road-surface height is less than the predetermined second threshold. In addition, the road-surface height estimating unit 26 may be configured to provide the estimation result of the road-surface height together with information that the estimation reliability is high when the number of road-surface points used to estimate the road-surface height is equal to or greater than the predetermined second threshold. While circumstances under which the estimation value of the road-surface height is able to be provided are broadened, the information that is the estimation reliability is provided. As a result, obstacle detection and vehicle control can be appropriately performed under various circumstances.

The correcting unit 27 may be configured to correct the mounting information of the imaging apparatus 30 based on changes over time in the road-surface height that is estimated by the road-surface height estimating unit 26. For example, when the offset in road-surface height has continued over a fixed period, an offset in the mounting of the imaging apparatus 30 may be considered to have occurred. The mounting information of the imaging apparatus 30 is corrected. As a result, the three-dimensional position of the object can be prevented from being corrected in each image recognition/obstacle detection process. Thus, processing load can be reduced.

In addition, the obstacle detection method that is applicable to the above-described obstacle detection apparatus 10 includes: an information acquiring step of acquiring a captured image of the vicinity of the vehicle; a three-dimensional estimating step of generating a three-dimensional estimation image that shows a three-dimensional position of a feature point in the captured image and estimating a three-dimensional position of an object in the vicinity of the vehicle based on the three-dimensional estimation image; an image classifying step of generating an attribute image in which an object in the captured image is classified into one or more classes that include at least a road-surface class; a road-surface point extracting step of fusing the three-dimensional estimation image and the attribute image, associating the feature points and the classes, and extracting road-surface points that are the feature points associated with the road-surface class; a road-surface height estimating step of estimating a road-surface height in the vicinity of the vehicle based on the road-surface points; a correcting step of correcting the three-dimensional position of the object in the vicinity of the vehicle based on the estimated road-surface height; and an obstacle detecting step of detecting an obstacle in the vicinity of the vehicle based on the three-dimensional position of the object in the vicinity of the vehicle. This obstacle detection method may further include steps corresponding to the embodiments described regarding the obstacle detection apparatus 10.

Furthermore, the obstacle detection apparatus 10 detects an obstacle in the vicinity of the vehicle based on a captured image of the vicinity of the vehicle captured by the imaging apparatus 30 by implementing an obstacle detection program that is stored in a storage medium (such as the memory 15) and includes processes performed by a processor (such as the image processing unit 13).

The processes related to the obstacle detection program include: an information acquiring step of acquiring a captured image of the vicinity of the vehicle; a three-dimensional estimating step of generating a three-dimensional estimation image that shows a three-dimensional position of a feature point in the captured image and estimating a three-dimensional position of an object in the vicinity of the vehicle based on the three-dimensional estimation image; an image classifying step of generating an attribute image in which an object in the captured image is classified into one or more classes that include at least a road-surface class; a road-surface point extracting step of fusing the three-dimensional estimation image and the attribute image, associating the feature points and the classes, and extracting road-surface points that are the feature points associated with the road-surface class; a road-surface height estimating step of estimating a road-surface height in the vicinity of the vehicle based on the road-surface points; a correcting step of correcting the three-dimensional position of the object in the vicinity of the vehicle based on the estimated road-surface height; and an obstacle detecting step of detecting an obstacle in the vicinity of the vehicle based on the three-dimensional position of the object in the vicinity of the vehicle. The processes related to this obstacle detection program may further include steps corresponding to the embodiments described regarding the obstacle detection apparatus 10.

The control unit and a method thereof described in the present disclosure may be implemented by a dedicated computer that is provided such as to be configured by a processor and a memory, the processor being programmed to provide one or a plurality of functions that are realized by a computer program. Alternatively, the control unit and a method thereof described in the present disclosure may be implemented by a dedicated computer that is provided by a processor being configured by a single dedicated hardware logic circuit or more. Still alternatively, the control unit and a method thereof described in the present disclosure may be implemented by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) storage medium that can be read by a computer as instructions performed by the computer.

What is claimed is:

1. An obstacle detection apparatus that detects an obstacle in a vicinity of a vehicle based on a captured image of the vicinity of the vehicle captured by an imaging apparatus, the obstacle detection apparatus comprising one or more processors configured to implement:

an information acquiring unit that acquires the captured image of the vicinity of the vehicle;

a three-dimensional estimating unit that generates a three-dimensional estimation image that shows a three-dimensional position of a feature point in the captured image and estimates a three-dimensional position of an object in the vicinity of the vehicle based on the three-dimensional estimation image;

an image classifying unit that generates an attribute image in which an object in the captured image is classified into one or more classes that include at least a road-surface class;
a road-surface point extracting unit that fuses the three-dimensional estimation image and the attribute image, associates the feature points and the classes, and extracts road-surface points that are the feature points associated with the road-surface class;
a road-surface height estimating unit that estimates a road-surface height in the vicinity of the vehicle based on the road-surface points, the estimating of the road-surface height including:
  determining reliability of a frequency distribution of a road-surface-point height, and;
  estimating, when it is determined that the frequency distribution is reliable, the road-surface height based on the frequency distribution of the road-surface-point height;
a correcting unit that corrects the three-dimensional position of the object in the vicinity of the vehicle based on the estimated road-surface height; and
an obstacle detecting unit that detects an obstacle in the vicinity of the vehicle based on the three-dimensional position of the object in the vicinity of the vehicle.

2. The obstacle detection apparatus according to claim 1, wherein:
the road-surface height is estimated in response to a number of extracted road-surface points being equal to or greater than a predetermined first threshold.

3. The obstacle detection apparatus according to claim 1, wherein:
the correcting unit corrects mounting information of the imaging apparatus based on changes over time in the road-surface height that is estimated by the road-surface height estimating unit.

4. An obstacle detection apparatus that detects an obstacle in a vicinity of a vehicle based on a captured image of the vicinity of the vehicle captured by an imaging apparatus, the obstacle detection apparatus comprising one or more processors configured to implement:
an information acquiring unit that acquires the captured image of the vicinity of the vehicle;
a three-dimensional estimating unit that generates a three-dimensional estimation image that shows a three-dimensional position of a feature point in the captured image and estimates a three-dimensional position of an object in the vicinity of the vehicle based on the three-dimensional estimation image;
an image classifying unit that generates an attribute image in which an object in the captured image is classified into one or more classes that include at least a road-surface class;
a road-surface point extracting unit that fuses the three-dimensional estimation image and the attribute image, associates the feature points and the classes, and extracts road-surface points that are the feature points associated with the road-surface class;
a road-surface height estimating unit that estimates a road-surface height in the vicinity of the vehicle based on the road-surface points that are continuously associated with the road-surface class for a predetermined period;
a correcting unit that corrects the three-dimensional position of the object in the vicinity of the vehicle based on the estimated road-surface height; and
an obstacle detecting unit that detects an obstacle in the vicinity of the vehicle based on the three-dimensional position of the object in the vicinity of the vehicle.

5. The obstacle detection apparatus according to claim 4, wherein:
the road-surface height estimating unit estimates the road-surface height in response to a number of extracted road-surface points being equal to or greater than a predetermined first threshold.

6. An obstacle detection apparatus that detects an obstacle in a vicinity of a vehicle based on a captured image of the vicinity of the vehicle captured by an imaging apparatus, the obstacle detection apparatus comprising one or more processors configured to implement:
an information acquiring unit that acquires the captured image of the vicinity of the vehicle;
a three-dimensional estimating unit that generates a three-dimensional estimation image that shows a three-dimensional position of a feature point in the captured image and estimates a three-dimensional position of an object in the vicinity of the vehicle based on the three-dimensional estimation image;
an image classifying unit that generates an attribute image in which an object in the captured image is classified into one or more classes that include at least a road-surface class;
a road-surface point extracting unit that fuses the three-dimensional estimation image and the attribute image, associates the feature points and the classes, and extracts road-surface points that are the feature points associated with the road-surface class;
a road-surface height estimating unit that estimates a road-surface height in the vicinity of the vehicle based on the road-surface points and that provides an estimation result of the road-surface height together with information that estimation reliability is low in response to the number of road-surface points that are used for estimation of the road-surface height being less than a predetermined second threshold;
a correcting unit that corrects the three-dimensional position of the object in the vicinity of the vehicle based on the estimated road-surface height; and
an obstacle detecting unit that detects an obstacle in the vicinity of the vehicle based on the three-dimensional position of the object in the vicinity of the vehicle.

7. An obstacle detection apparatus that detects an obstacle in a vicinity of a vehicle based on a captured image of the vicinity of the vehicle captured by an imaging apparatus, the obstacle detection apparatus comprising one or more processors configured to implement:
an information acquiring unit that acquires the captured image of the vicinity of the vehicle;
a three-dimensional estimating unit that generates a three-dimensional estimation image that shows a three-dimensional position of a feature point in the captured image and estimates a three-dimensional position of an object in the vicinity of the vehicle based on the three-dimensional estimation image;
an image classifying unit that generates an attribute image in which an object in the captured image is classified into one or more classes that include at least a road-surface class;
a road-surface point extracting unit that fuses the three-dimensional estimation image and the attribute image, associates the feature points and the classes, and extracts road-surface points that are the feature points associated with the road-surface class;

a road-surface height estimating unit that estimates a road-surface height in the vicinity of the vehicle based on the road-surface points and that provides an estimation result of the road-surface height together with information that estimation reliability is high in response to the number of road-surface points that are used for estimation of the road-surface height being equal to or greater than a predetermined second threshold;

a correcting unit that corrects the three-dimensional position of the object in the vicinity of the vehicle based on the estimated road-surface height; and an obstacle detecting unit that detects an obstacle in the vicinity of the vehicle based on the three-dimensional position of the object in the vicinity of the vehicle.

8. The obstacle detection apparatus according to claim 7, wherein:

the correcting unit corrects mounting information of the imaging apparatus based on changes over time in the road-surface height that is estimated by the road-surface height estimating unit.

9. An obstacle detection method that is applicable to an obstacle detection apparatus that detects an obstacle in a vicinity of a vehicle based on a captured image of the vicinity of the vehicle captured by an imaging apparatus, the obstacle detection method comprising:

an information acquiring step of acquiring a captured image of the vicinity of the vehicle;

a three-dimensional estimating step of generating a three-dimensional estimation image that shows a three-dimensional position of a feature point in the captured image and estimating a three-dimensional position of an object in the vicinity of the vehicle based on the three-dimensional estimation image;

an image classifying step of generating an attribute image in which an object in the captured image is classified into one or more classes that include at least a road-surface class;

a road-surface point extracting step of fusing the three-dimensional estimation image and the attribute image, associating the feature points and the classes, and extracting road-surface points that are the feature points associated with the road-surface class;

a road-surface height estimating step of estimating a road-surface height in the vicinity of the vehicle based on the road-surface points, the road-surface height estimating step comprising:

determining reliability of a frequency distribution of a road-surface-point height, and estimating, when determined that the frequency distribution is reliable, the road-surface height based on the frequency distribution of the road-surface-point height;

a correcting step of correcting the three-dimensional position of the object in the vicinity of the vehicle based on the estimated road-surface height; and an obstacle detecting step of detecting an obstacle in the vicinity of the vehicle based on the three-dimensional position of the object in the vicinity of the vehicle.

10. A non-transitory computer-readable storage medium storing therein an obstacle detection program that includes processes that are performed by a processor to detect an obstacle in a vicinity of a vehicle based on a captured image of the vicinity of the vehicle captured by an imaging apparatus, the processes including:

an information acquiring step of acquiring a captured image of the vicinity of the vehicle;

a three-dimensional estimating step of generating a three-dimensional estimation image that shows a three-dimensional position of a feature point in the captured image and estimating a three-dimensional position of an object in the vicinity of the vehicle based on the three-dimensional estimation image;

an image classifying step of generating an attribute image in which an object in the captured image is classified into one or more classes that include at least a road-surface class;

a road-surface point extracting step of fusing the three-dimensional estimation image and the attribute image, associating the feature points and the classes, and extracting road-surface points that are the feature points associated with the road-surface class;

a road-surface height estimating step of estimating a road-surface height in the vicinity of the vehicle based on the road-surface points, the road-surface height estimating step comprising determining reliability of a frequency distribution of a road-surface-point height, and estimating, when determined that the frequency distribution is reliable, the road-surface height based on the frequency distribution of the road-surface-point height;

a correcting step of correcting the three-dimensional position of the object in the vicinity of the vehicle based on the estimated road-surface height; and an obstacle detecting step of detecting an obstacle in the vicinity of the vehicle based on the three-dimensional position of the object in the vicinity of the vehicle.

\* \* \* \* \*